United States Patent [19]

Townsend

[11] Patent Number: 4,561,150

[45] Date of Patent: Dec. 31, 1985

[54] SKINNING MACHINE HAVING FEED DEVICE AND METHOD FOR USING SAME

[76] Inventor: Ray T. Townsend, 3131 Fleur Dr., Des Moines, Iowa 50321

[21] Appl. No.: 557,879

[22] Filed: Dec. 5, 1983

[51] Int. Cl.$^4$ ............................................. A22C 17/12
[52] U.S. Cl. ............................................. 17/50; 17/21
[58] Field of Search .................. 17/21, 50, 62; 99/589

[56] References Cited

U.S. PATENT DOCUMENTS 4,340,995  7/1982  Braeger ............................... 17/21 X

FOREIGN PATENT DOCUMENTS

| 2362772 | 6/1975 | Fed. Rep. of Germany | 17/21 |
| 2420188 | 11/1975 | Fed. Rep. of Germany | . |
| 0093318 | 4/1983 | Fed. Rep. of Germany | . |
| 1435656 | 4/1974 | United Kingdom | . |
| 1587884 | 8/1977 | United Kingdom | . |

*Primary Examiner*—Willie G. Abercrombie
*Attorney, Agent, or Firm*—Zarley, McKee, Thomte, Voorhees & Sease

[57] ABSTRACT

The skinning machine of the present invention comprises a skinning blade having a knife edge presented in a first direction. A gripping roll is rotatably mounted adjacent the knife edge for grasping the skin layer of the meat and pulling the meat into the blade for separating the skin from the meat. A feed device is provided above the gripping roll and the skinning blade for feeding the meat to be skinned towards the gripping roll. The feed means includes a chute having an upper end spaced above the gripping roll and a lower end in close proximity to the gripping roll. The meat is fed into the chute from behind the skinning blade. As the meat passes downwardly through the chute, its directional movement is reversed so that it is moving toward the operator when it exits from the chute and is grasped by the gripping roll. Safety is enhanced by virtue of the fact that the cutting blade faces away from the operator, and further by the fact that the meat is fed into the chute at a point spaced above the gripping roll and the skinning knife.

20 Claims, 7 Drawing Figures

SKINNING MACHINE HAVING FEED DEVICE AND METHOD FOR USING SAME

BACKGROUND OF THE INVENTION

This invention relates to a skinning machine and a method for using same.

Presently used meat skinning machines generally include a supporting surface on which the meat to be skinned is placed. The meat is moved until it is engaged by a toothed gripping roll which grasps the meat and pulls it into a meat skinning blade, whereupon the skin layer is separated from the meat. In most presently used machines, the knife blade faces toward the operator. The operator moves the meat into contact with the gripping roll, and as the meat is grasped by the gripping roll, it is pulled away from the hands of the operator and into contact with the skinning blade.

It is desirable, however, to provide a means for automatically feeding the meat into engagement with the gripping roll so as to eliminate the possibility of the operator's hands becoming entangled with the gripping roll.

Therefore, a primary object of the present invention is the provision of an improved meat skinning machine having an automatic feed device for feeding the meat into engagement with the gripping roll.

A further object of the present invention is the provision of an improved meat skinning machine wherein the knife blade for skinning the meat faces away from the operator.

A further object of the present invention is the provision of an improved meat skinning machine having an automatic feed device which permits the operator to feed the meat into the machine at a point spaced from the gripping roll and skinning blade.

A further object of the present invention is the provision of a meat skinning machine having an automatic feed device which can easily be folded away from the gripping roll and skinning blade so as to permit the meat skinning machine to be utilized for skinning hams and the like.

A further object of the present invention is the provision of a meat skinning machine having an automatic feed device which, while permitting the operator to feed the meat into the machine from a point remote from the gripping roll, also permits the application of pressure to the meat as it is engaged by the gripping roll and the skinning blade.

A further object of the present invention is the provision of a meat skinning machine having an automatic feed device which permits the operator to see the meat throughout the skinning process.

A further object of the present invention is the provision of a meat skinning machine having a feed device which, by virtue of its own weight, helps to hold the meat down against the gripping roll as it is engaged by the gripping roll.

A further object of the present invention is the provision of a meat skinning machine wherein the operator is positioned behind the skinning blade and the gripping roll.

A further object of the present invention is the provision of a feed device for a meat skinning machine which includes a feeding wheel which may be manually rotated or alternatively could be rotated by power means.

A further object of the present invention is the provision of a meat skinning machine wherein the meat is both fed into and exits from the same side of the machine.

A further object of the present invention is the provision of a device which is economical to manfacture, durable in use and efficient in operation.

SUMMARY OF THE INVENTION

The present invention utilizes a skinning blade which faces in a direction away from the operator. A gripping roll is positioned adjacent the skinning blade and rotates in a direction wherein its upper surface moves towards the cutting edge of the skinning blade.

A feed wheel or roller is positioned above the gripping roll and the knife blade. The roller includes a plurality of cross bars which form the outer cylindrical surface of the roller. The roller rotates about a horizontal axis and its outer cylindrical surface at the lower portion thereof is positioned in close spaced relationship above the gripping roll. An arcuate shield member is positioned adjacent the feed wheel and includes a concave surface which faces toward the operator. A feed chute is defined in the space between the concave surface of the shield, and the convex surface or cylindrical surface of the feed wheel. The lower edge of the concave surface of the shield is positioned adjacent the gripping roll and the upper end of the concave surface of the shield is positioned slightly above the upper surface of the feed wheel. This defines an arcuate chute, the upper end of which is adjacent the upper end of the shield, and the lower end of which is adjacent the gripping roll.

In an alternate form of the invention, the gripping roll is positioned at the lower end of the chute and engages and conveys the meat into the skinning position, and through the machine.

The operator feeds the meat into the upper end of the feed chute by placing the meat on the cylindrical surface of the feed wheel and by rotating the feed wheel to draw the meat into the feed chute. The meat progresses downwardly through the feed chute, reversing its direction so that when it reaches the gripping roll, it exits from the feed chute in a direction back toward the operator. The gripping roll then grasps the meat to be skinned and pulls it toward the cutting edge of the skinning knife for separating the meat from the skin layer. After the meat has been skinned, it exits from the skinning machine onto a table which is positioned between the operator and the skinning blade. Thus, the meat exits from the machine on the same side of the machine from which it is inserted.

The feed wheel is suspended by a linkage system which permits the feed wheel to be manually pressed downwardly onto the meat during the time that the meat is being skinned. This permits the application of pressure to the meat without placing the operator's hands in the vicinity of the gripping roll or knife edge.

The feed wheel includes a plurality of spaced apart bars, but permits the operator to see through the wheel down toward the gripping roll and the knife edge. This gives the operator visual perception of the meat at the time that it is being skinned.

For certain applications such as the skinning of hams, it is necessary to move the feed device out of the way so that the ham can be skinned. The linkage system suspending the shield and the feed wheel permit both of these devices to be pivoted out of the way of the gripping roll and the skinning blade so that a ham can be skinned.

The feed wheel of the present invention is preferably rotated by hand, although it is also possible to connect the feed wheel by means of a drive belt to a power means for rotating the feed wheel automatically.

The linkage system which suspends the feed wheel also holds the feed wheel and concave surface of the shield in a constant stationary relationship with respect to one another. At the same time, the linkage permits the feed wheel to move downwardly toward the gripping roll for applying pressure to the meat. It also permits the feed wheel to be pivoted away from the gripping roll. Throughout these movements, however, the concave surface of the shield is maintained in a constant fixed position relative to the feed wheel.

DETAILED DESCRIPTION OF THE PREFERRED EMBODIMENT

Figure 1:
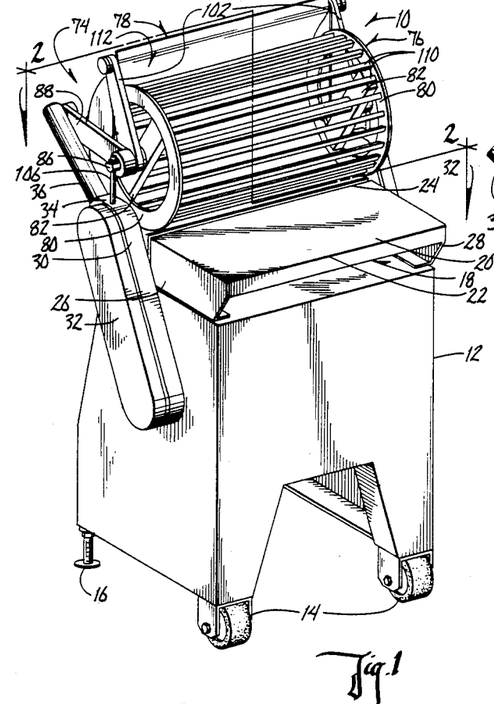
FIG. 1 is a perspective view of the skinning machine of the present invention.
Figure 2:
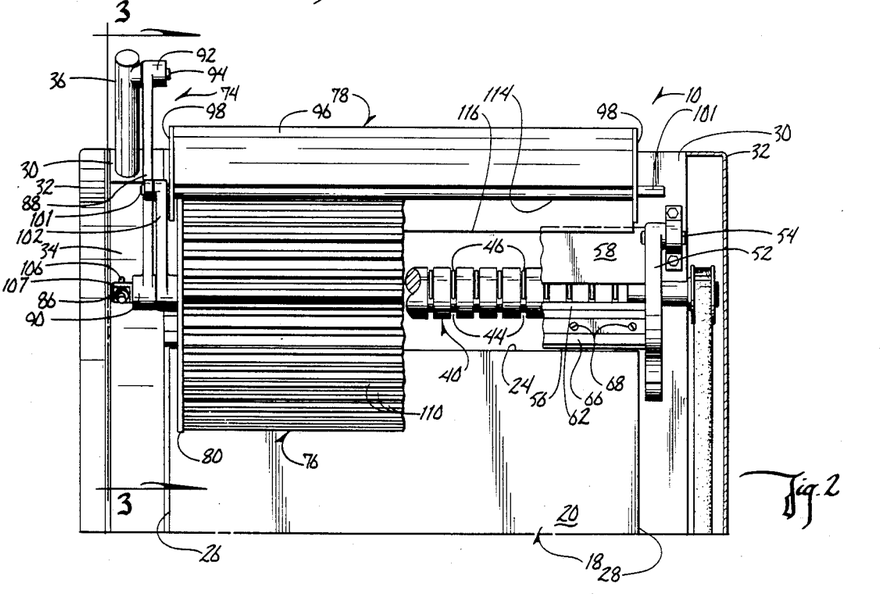
FIG. 2 is a top plan view of the device shown in FIG. 1, showing certain portions broken away.

Referring to the drawings, the numeral 10 generally designates the skinning machine of the present invention. Machine 10 comprises a cabinet frame 12, having front roller wheels 14, and rear leveling feet 16. Mounted to the upper surface of cabinet frame 12 is a work table 18, having a table top 20 which includes a rear edge 22 and a forward edge 24. Table 18 also includes side legs 26, 28 which are operatively attached to cabinet frame 12.

Attached to the opposite sides of cabinet frame 12 are a pair of sprocket mounting frames 30, each of which have a sprocket housing 32 attached thereto. Sprocket housing 32 encloses the chain and sprocket drives (not shown) for driving the gripping roll of the present invention. The upper end of sprocket mounting frame 30 includes an upwardly presently horizontal surface 34.

Figures 4, 5, 6:
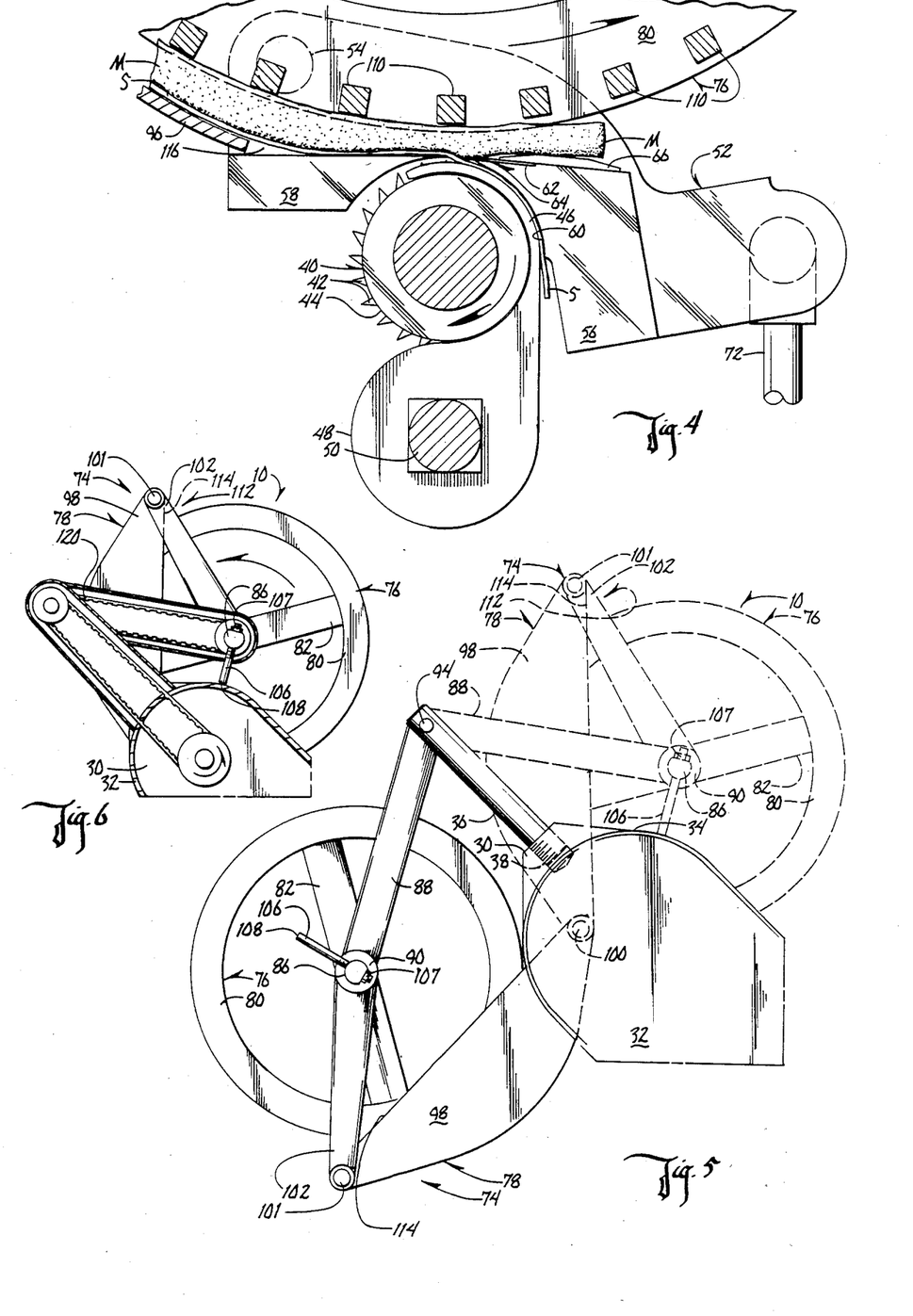
FIG. 4 is an enlarged detail sectional view showing the meat being skinned.
FIG. 5 is a sectional view similar to FIG. 3, but showing the feed device folded to its inoperative position.
FIG. 6 is a sectional view showing a modified form of the present invention utilizing a power driven feed wheel.

A pair of support arms 36 each include a lower threaded end 38 which is threadably received in the upper end of sprocket mounting frame 30 (FIG. 5).

A gripping roll 40 is rotatably journaled between the upper ends of sprocket mounting frames 30 and is driven by the chain and sprocket (not shown) within housing 32. Gripping roll 40 includes on its outer surface a plurality of gripping teeth 42 and a plurality of annular grooves 44. Seated within annular grooves 44 are a plurality of stripper fingers 46 which are each part of a stripper element 48. Stripper elements 48 are mounted to a transverse shaft 50 which extends parallel to gripper roll 40.

A pair of blade mounting arms 52 are each pivotally mounted to the interior facing sides of sprocket mounting frames 30 for pivotal movement about a horizontal axis designated by the numeral 54. Extending between arms 52 are a pressure shoe 56 and a feed shoe 58. Pressure shoe 56 includes a concave surface 60 which is concentric to the outer cylindrical surface of gripping roll 40. Attached to the upper surface of pressure shoe 56 is a skinning blade 62 having a cutting edge 64. Skinning blade 62 is held in place by a hold-down plate 66 which is attached to pressure shoe 56 by means of machine screws 68. Cutting edge 64 is located on a line which is substantially tangential to the curvature of concave surface 60 and which is also in close spaced tangential relationship to the outer surface of gripping roll 42.

Attached to blade mounting means 52 is a control rod 72 which is connected to control means (not shown) for positively controlling the rotation of blade mounting arms 52 about the pivotal axis 54. This permits the distance between the concave surface 60 of pressure shoe 56 and the outer convex surface of the gripping roll to be adjusted until the desired distance is achieved.

A feed assembly generally designated by the numeral 74 is mounted above gripping roll 40 and includes a feeding wheel 76 and an arcuate shield 78. Feeding wheel 76 includes a pair of circular wheel rims 80 each of which has a spoke bar 82 extending through its diameter. Spoke bars 82 are each attached to rims 80 by means of bolts 84 or other securing means. A wheel axle 86 extends through spoke bars 82 at the circular center of wheel 76.

A wheel link 88 includes bushings 90, 92 at its opposite ends. Bushing 90 is rotatably mounted over wheel axle 86 and bushing 92 is hinged to the upper end of support arm 36 by means of a hinge pin 94. This permits wheel 76 to swing about the axis provided by pin 94, and also permits wheel 80 to rotate about the axis provided by wheel axle 86.

Shield 78 includes an arcuate plate member 96 having a concave surface which faces toward wheel 76. Attached to the opposite sides of plate 96 are a pair of side plates 98 which impart rigidity to plate 96. At the lower end of shield 78 is a hinge 100 which pivotally mounts shield 78 to the upper end of sprocket mounting frame 30 for pivotal movement about a horizontal axis.

The upper end of shield 78 has a horizontal shaft 101 operatively attached thereto. Rotatably mounted to shaft 101 are a pair of shield links 102 which extend downwardly and are rotatably mounted about wheel axle 86.

Figure 3:
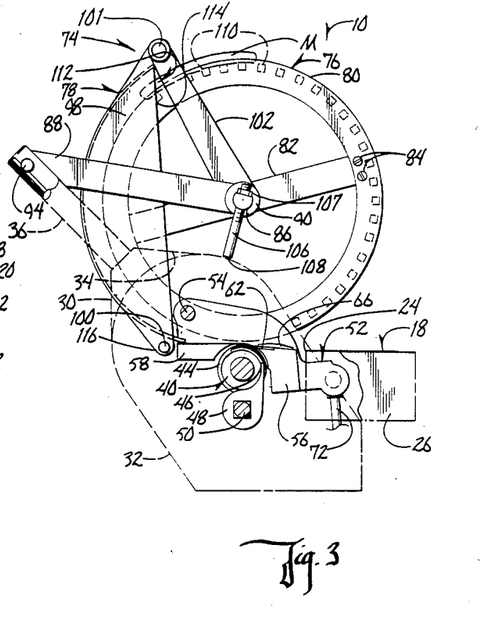
FIG. 3 is a sectional view taken along line 3—3 of FIG. 2.

A stop shaft 106 threadably extends through the end of wheel shaft 86 and is held in place by means of a nut 107. As can be seen in FIG. 1 and 3, shaft 106 has a lower end 108 which rests upon the horizontal surface 34 of sprocket mounting frame 30. This limits the downward swinging movement of wheel axle 86 about its hinge axis 94. The stop shaft 106 is threadably adjustable to raise and lower wheel axle 86 to the desired height. Preferably the wheel axle should be kept in a position which permits the wheel to be in close spaced relation to the gripping roll 40 and the knife edge 64.

Feeding wheel 76 also includes a plurality of spaced apart bars 110, which extend between the two wheel rims 80 and which form an outer cylindrical surface for the wheel 76. These bars are preferably square in cross-section, and they are spaced apart so that the operator can see through the diameter of the wheel and downwardly into the area where the gripping roll and the knife are located.

In operating the device, the operator stands behind rear edge 22 of table 20. The operator places a piece of meat "M" having a layer of skin "S" thereon, onto the uppermost portion of wheel 76. The meat is placed on the bars 110 with the skin S presented upwardly. The operator then manually rotates wheel 76 so that the meat M passes downwardly between the concave surface 96 of shield 78, and the convex surface formed by the various rods 110.

The space between concave surface 96 and the outer convex surface of wheel 76 defines a feed chute 112 having an upper end 114 and a lower end 116. Concave surface 96 is shaped so that it is concentric to the outer convex surface of wheel 76 throughout most of its length. The portion of concave surface 96 adjacent its lower end converges slightly toward the cylindrical surface of wheel 76. Thus, feed chute 112 has a constant width throughout most of its length, with the exception of its lower end 116 which reduces slightly in width. While different widths for chute 112 may be chosen, a preferred width for the constant portion thereof is approximately two inches.

The distance of the cylindrical surface of the feed wheel 76 may be adjusted by rotating stop shaft 106. This distance should be set so that it is slightly less than the thickness of the meat so that the weight of wheel 76 will apply downward pressure to the meat adjacent the gripping roll 40. As the meat reaches the lower end 116 of chute 112, it is engaged by and grasped by the teeth 42 of roller 40 and is pulled towards the skinning knife which separates the skin S from the meat M, as is shown in FIG. 4. The skin passes downwardly around gripping roll 40 and is stripped off of the roll by means of strippers 40.

The meat passes above knife blade 62 and passes onto the upper surface 20 of work table 18. Thus, the meat may be fed into the machine prior to skinning, and removed from the machine after skinning from the same side of the device.

The weight of wheel 76 applies downward pressure to the meat. However, one advantage obtained by the present device is the ability of the operator to apply additional downward pressure to the meat as it is engaged by the gripping roll. This is accomplished by the operator placing his hands upon the upper surface of wheel 76 and pressing downwardly. Wheel 76 rotates about axis 94 and moves downwardly until limited either by the thickness of the meat or by shaft 106 engaging flat surface 34. Thus, it is possible to set the shaft 106 at a level less than the thickness of the meat, so that the operator can apply pressure to the meat while it is engaging gripping roll 40. This insures a complete and thorough skinning operation, while at the same time permitting the operator to keep his hands remote from the meat during the skinning process.

Another advantage obtained from the present device is the ability of the operator to see through the diameter of the wheel 76 during the skinning operation. This is possible due to the spaced arrangement of rods 110. Thus, the operator can see the meat throughout the entire time that the meat is entering chute 112 until after it has been skinned.

The wheel 76 can be folded upwardly away from the gripping roll 40 merely by lifting upwardly on wheel 76. This causes the wheel to rotate from the position shown in FIG. 3 to the position shown in FIG. 5. During this folding motion, link 88 moves upwardly in a clockwise direction. At the same time, shield 78 swings in a clockwise direction about its hinge axis 100 as indicated by arrow 118. Link 102 rotates in a clockwise direction about axis 101 from the position shown in FIG. 3 to the position shown in FIG. 5. With the wheel 76 folded back in the position shown in FIG. 5, it is possible to provide a skinning operation for an object such as a ham which is not flat, and which would not fit within chute 112.

The linkage of the present device maintains shield 78 and wheel 76 in constant fixed relation to one another throughout any swinging or folding movement. This insures that the shape of chute 112 will always be the same regardless of the position of wheel 76.

The present invention provides many advantages from a safety standpoint. The operator can feed the meat into the machine and receive the meat from the machine from the same side. It is not necessary to retrieve the meat from the opposite side of the machine as with previous skinning devices. Furthermore, the operator can accomplish the entire skinning operation without placing his hands in the vicinity of the gripping roll or the meat skinning blade.

Safety is also enhanced by virtue of the fact that the operator's hands are not engaging the meat at the time that it is being skinned. This eliminates the possibility that the operator's hands might somehow be drawn into the blade with the meat.

Another advantage obtained from the present machine is the ability of the operator to apply pressure to the meat during the skinning operation without at the same time having to touch the meat or place his hands in the vicinity of the gripping roll or the skinning blade.

While the device is shown with the wheel 76 being manually rotated, it is also possible to rotate the wheel 76 by power means. All that is necessary is to apply a sprocket to wheel 76 which can be driven by a chain or belt. FIG. 6 illustrates the use of a bell drive 120 for rotating wheel 76. However, the present device can be easily operated manually without the need for any power means to rotate wheel 76.

Figure 7:
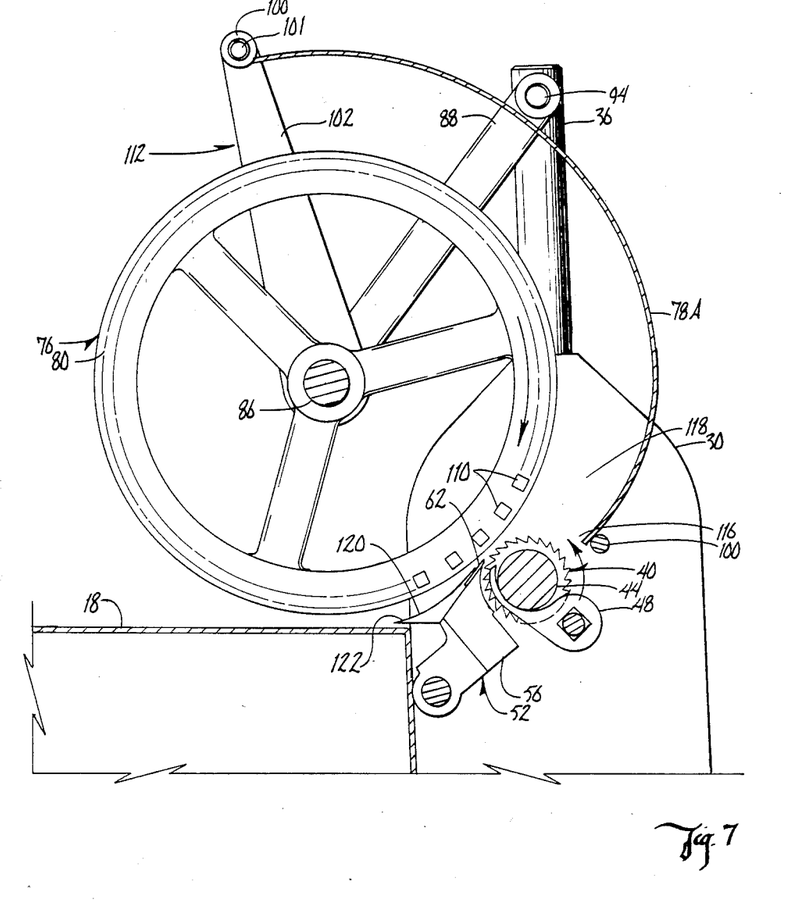
FIG. 7 is a sectional view similar to FIG. 6 showing a modified form of the invention.

All of the aforementioned advantages are also present in the modified form of the invention shown in FIG. 7. Similar numerals have been used in FIG. 7 to denote like parts previously described. The modified shield 78A is substantially concentrically spaced from the periphery of wheel 76 except that this space narrows slightly near the lower end 116. It has been determined that all meat products do not always easily slide downwardly over the inner surface of the previously described shield 78. The structure of FIG. 7 moves the shield 78A and gripping roll 40 approximately 45° with respect to the structure of FIG. 3. Also, gripping roll 40 in FIG. 7 essentially spans the bottom 116 of the feed chute formed by shield 78A so that a substantial portion (about 50 percent) of its periphery is exposed to the space 118 which exists between wheel 76 and shield 78A. This permits the gripping roll 40 to function as a conveyor of the meat to pull the meat towards blade 62.

Transition piece 120 with lip 122 facilitates the exiting of the meat from the feed chute after the skinning operation takes place. Thus, the meat product is placed in the chute as previously described. The gripping roll grips the meat to pull it through the chute towards the blade 62. As the thickness of the meat passes over the blade 62, the wheel 76 pivots upwardly to accommodate the thickness of skinned meat passing over the blade and between the gripping roll and the periphery of wheel 76. Transition piece 120 facilitates the movement of the skinned meat to table 18 or any suitable receiving surface. Gripping roll 40 as well as wheel 76 can function to convey the meat past the cutting station of blade 62.

Thus, it can be seen that the device accomplishes at least all of its stated objectives.

What is claimed is:

1. A feed device for feeding a piece of meat having a skin layer thereon into a meat skinning machine comprising a skinning blade means containing a knife edge presented in a first direction, a gripping roll having an outer toothed surface mounted for rotation about a horizontal axis adjacent said knife edge so that said outer toothed surface will move toward and closely adjacent said knife edge, said feed device comprising:

a cylindrical feed wheel positioned above said gripping roll and being rotatably mounted about a second horizontal axis spaced above said gripping roll, said feed wheel having an outer cylindrical portion formed of a material which permits viewing through said wheel;

an arcuate shield member having a concave surface positioned in outwardly spaced relation to said outer cylindrical portion of said feed wheel, said shield having an upper end spaced above said gripping roll and a lower end adjacent said gripping roll;

said spaced apart shield member and cylindrical portion of said feed wheel defining a feed chute positioned above said gripping roll for receiving said piece of meat and guiding said meat toward said gripping roll, said feed chute having an upper intake end formed by said upper end of said shield member and positioned in spaced relation above said gripping roll and a lower outlet end formed by said lower end of said shield member and positioned closely adjacent said gripping roll;

said outlet end of said chute facing toward said skinning blade whereby said gripping roll will grasp said meat as said meat exits from said outlet end and will pull said meat toward said knife edge for separating said skin layer from said meat.

2. A device according to claim 1 wherein said feed wheel comprises spaced apart circular wheel ends, said cylindrical portion of said feed wheel comprising a plurality of horizontal spaced apart rods extending between and attached to said wheel ends, the spaced apart relation of said rods permitting viewing through said wheel.

3. A device according to claim 1 wherein wheel mounting means movably mount said wheel with respect to said gripping roll for movement toward and away from said gripping roll.

4. A device according to claim 3 wherein said wheel mounting means comprise link means interconnecting said wheel and said upper end of said shield member, said link means being pivotally mounted to said upper end of said shield means for pivotal movement about a third horizontal axis, said wheel being capable of swinging movement about said third axis from a normal position wherein said wheel is in close spaced relation over said gripping roll to an inoperative position wherein said wheel is positioned away from and out of covering relation over said gripping roll.

5. A device according to claim 1 comprising power means drivingly connected to said wheel for rotating said wheel in a rotational direction opposite from the rotational direction of said gripping roll whereby the adjacent surfaces of said gripping roll and said wheel both move toward said knife edge.

6. A meat skinning machine for skinning a piece of meat having a skin layer thereon comprising:

a table having a rear edge and a forward edge;

skinning blade means mounted adjacent said forward edge of said table and having a knife blade with a cutting edge extending forwardly away from said table;

a toothed gripping roll positioned adjacent and forwardly of said skinning blade means and being rotatably mounted for rotation about a first horizontal axis, said gripping roll having an upper surface adapted to move toward said blade during rotation of said gripping roll;

feed means positioned above said gripping roll, said feed means including a feed chute having an inlet opening spaced above said gripping roll and an outlet opening positioned below said inlet opening and closely adjacent said gripping roll;

said inlet opening facing toward said table;

said outlet opening facing rearwardly toward said cutting edge;

said chute following a path which reverses directions between said inlet opening and said outlet opening, whereby said meat after being introduced into said inlet opening, will pass through said chute and exit from said outlet opening moving in a rearward direction towards said cutting edge of said knife blade.

7. A device according to claim 6 wherein said chute includes an inner arcuate support surface and an outer arcuate support surface spaced apart from one another.

8. A device according to claim 7 wherein said chute comprises a cylindrical feed wheel rotatably mounted about a second horizontal axis spaced above said first horizontal axis of said gripping roll, said feed wheel having a cylindrical outer portion which defines said inner arcuate support surface.

9. A device according to claim 6 wherein said feed chute is movably mounted with respect to said gripping roll and said skinning blade means for movement from a first position wherein said feed chute is positioned in covering relation above said gripping roll to a second position located forwardly of said skinning blade means.

10. A machine for skinning a piece of meat having a skin layer thereon, said machine comprising:

a support means having a rear edge and a forward edge;

skinning blade means mounted adjacent said forward edge of said support means and having a knife blade with a cutting edge presented forwardly away from said support means;

a cylindrical toothed gripping roll positioned forwardly of said blade means and being rotatably mounted for rotation about a first horizontal axis, said gripping roll having a toothed cylindrical surface for gripping the skin of said meat and for pulling said meat rearwardly toward said cutting edge for separating said skin form said meat;

a cylindrical feed wheel pivotally mounted for rotation about a second horizontal axis above said gripping roll and said blade means, said feed wheel having an outer cylindrical portion which moves in a circle during rotation of said wheel, the lowermost portion of said circle being in close spaced relation above said gripping roll and said blade means;

an arcuate shield member positioned forwardly of said wheel and having a rearwardly presented concave surface located in outward radial spaced relation to said outer cylindrical portion of said wheel, said shield member having an upper end positioned above said wheel and a lower end positioned adjacent said gripping roll.

11. A method for feeding a piece of meat having a skin layer thereon into a meat skinning machine having skinning blade means containing a knife edge presented in a first direction, a toothed gripping roll having an outer toothed surface rotatably mounted for rotation about a horizontal axis adjacent said knife edge so that said outer surface of said roll will move toward said knife edge; said method comprising:

introducing said piece of meat into an inlet opening of a feed chute, said inlet opening facing in a second direction opposite from said first direction and being spaced above said gripping roll, said chute having an outlet opening facing in said second direction and being positioned below said inlet opening and closely adjacent said gripping roll and said knife edge;

moving said meat downwardly through said chute until said skin of said meat exits from said outlet opening, is grasped by said gripping roll, and is pulled toward said knife edge for removing said skin from said meat;

reversing the direction of movement of said meat during the time that said meat is moving from said inlet opening to said outlet opening of said chute whereby said meat enters said chute in said first direction and exits said chute in said second direction.

12. A method for feeding a piece of meat having a skin layer thereon into a meat skinning machine having a skinning blade means containing a knife edge presented in a forward direction, a gripping roll having an outer toothed gripping surface rotatably mounted about a horizontal axis adjacent said knife edge so that said outer surface of said roll will grip said piece of meat, said method comprising:

placing said meat on the upper cylindrical surface of a feed wheel which is rotatably mounted above said gripping roll for rotation about a horizontal axis, the cylindrical surface of said feed wheel being at its lowest point in close spaced relation to said gripping roll;

rotating said wheel with said meat thereon from an initial position wherein said meat is above said wheel to a skinning position wherein said meat is between said wheel and said gripping roll;

positioning said meat against said cylindrical surface of said feeding wheel during rotation from said initial position to said skinning position by means of an arcuate shield member having a concave surface spaced radially outwardly from said cylindrical surface of said wheel.

13. A method according to claim 12 wherein said wheel is movably mounted for movement toward and away from said gripping roll, said method further comprising applying downward pressure to said meat by permitting the weight of said wheel to rest on said meat when said meat is in engagement with said gripping roll.

14. A method according to claim 13 and further comprising applying additional downward pressure on said meat by manually pressing downwardly on said wheel.

15. A feed device for feeding a piece of meat having a skin layer thereon into a meat skinning machine comprising a skinning blade means containing a knife edge presented in a first direction, a gripping roll having an outer toothed surface mounted for rotation about a horizontal axis adjacent said knife edge so that said outer toothed surface will move toward and closely adjacent said knife edge, said feed device comprising:

a feed chute positioned above said gripping roll for receiving said piece of meat and guiding said meat toward said gripping roll, said feed chute having an upper intake and positioned in spaced relation above said gripping roll and a lower outlet end positioned closely adjacent said gripping roll;

said outlet end of said chute facing toward said skinning blade whereby said gripping roll will convey said meat from said outlet end toward said knife edge for separating said skin layer from said meat;

said chute following a path which reverses directions between said inlet opening and said outlet opening, whereby said meat after being introduced into said inlet opening, will pass through said chute and exit from said outlet opening moving in a second direction towards said cutting edge of said knife blade.

16. A device according to claim 15 wherein said feed chute is defined between a cylindrical feed wheel and an arcuate shield member, said cylindrical feed wheel being positioned above said gripping roll and rotatably mounted about a second horizontal axis spaced above said gripping roll, said feed wheel having an outer cylindrical portion which during rotation of said wheel passes in a circular path from an uppermost position to a lowermost position located in close spaced relation to said gripping roll, said arcuate shield member having a concave surface positioned in radially outwardly spaced relation to said outer cylindrical portion of said feed wheel, said shield having an upper end spaced above said gripping roll and a lower end adjacent said gripping roll.

17. A device according to claim 15 wherein substantially one-half of the periphery of said gripping roll is exposed to the interior of said feed chute at the lower outlet end.

18. A device according to claim 16 wherein substantially one-half of the periphery of said gripping roll is exposed to the interior of said feed chute at the lower outlet end.

19. A feed device for feeding a piece of meat having a skin layer thereon into a meat skinning machine comprising a skinning blade means containing a knife edge presented in a first direction, a gripping roll having an outer toothed surface mounted for rotation about a horizontal axis adjacent said knife edge so that said outer toothed surface will move toward and closely adjacent said knife edge, said feed device comprising:

a feed chute positioned above said gripping roll for receiving said piece of meat and guiding said meat toward said gripping roll, said feed chute having an upper intake end positioned in spaced relation above said gripping roll and a lower outlet end positioned closely adjacent said gripping roll;

said outlet end of said chute facing toward said skinning blade whereby said gripping roll will grasp said meat as said meat exits from said outlet end and will pull said meat toward said knife edge for separating said skin layer from said meat;

said feed chute being defined between a cylindrical feed wheel and an arcuate shield member, said feed wheel being positioned above said gripping roll and rotatably mounted about a second horizontal axis;

said feed wheel having an outer cylindrical portion which during rotation of said wheel passes in a circular path from an uppermost position to a lowermost position located in close spaced relation to said gripping roll, said arcuate shield member having a concave surface positioned in radially outwardly spaced relation to said outer cylindrical portion of said feed wheel, said shield having an upper end spaced above said gripping roll and a lower end adjacent said gripping roll;

said feed wheel comprising spaced apart circular wheel ends, said cylindrical portion of said feed wheel comprising a plurality of horizontal spaced apart rods extending between and attached to said wheel ends, the spaced apart relation of said rods permitting viewing through said wheel.

20. A feed device for feeding a piece of meat having a skin layer thereon into a meat skinning machine comprising a skinning blade means containing a knife edge presented in a first direction, a gripping roll having an outer toothed surface mounted for rotation about a horizontal axis adjacent said knife edge so that said outer toothed surface will move toward and closely adjacent said knife edge, said feed device comprising:

a feed chute positioned above said gripping roll for receiving said piece of meat and guiding said meat toward said gripping roll, said feed chute having an upper intake end positioned in spaced relation above said gripping roll and a lower outlet end positioned closely adjacent said gripping roll;

said outlet end of said chute facing toward said skinning blade whereby said gripping roll will grasp said meat as said meat exits from said outlet end and will pull said meat toward said knife edge for separating said skin layer from said meat;

said feed chute being defined between a cylindrical feed wheel and an arcuate shield member, said feed wheel being positioned above said gripping roll and rotatably mounted about a second horizontal axis;

said feed wheel having an outer cylindrical portion which during rotation of said wheel passes in a circular path from an uppermost position to a lowermost position located in close spaced relation to said gripping roll, said arcuate shield member having a concave surface positioned in radially outwardly spaced relation to said outer cylindrical portion of said feed wheel, said shield having an upper end spaced above said gripping roll and a lower end adjacent said gripping roll;

wheel mounting means movably mounting said wheel with respect to said gripping roll for movement toward and away from said gripping roll, said wheel mounting means comprising link means interconnecting said wheel and said upper end of said shield member, said link means being pivotally mounted to said upper end of said shield means for pivotal movement about a third horizontal axis, said wheel being capable of swinging movement about said third axis from a normal position wherein said wheel is in close spaced relation over said gripping roll to an inoperative position wherein said wheel is positioned away from and out of covering relation over said gripping roll.

* * * * *

UNITED STATES PATENT AND TRADEMARK OFFICE
CERTIFICATE OF CORRECTION

PATENT NO. : 4,561,150
DATED : December 31, 1985
INVENTOR(S) : Ray T. Townsend

It is certified that error appears in the above—identified patent and that said Letters Patent is hereby corrected as shown below:

Column 3, line 52, "presently" should be --presented--.

Column 4, line 13, "42" should be --40--.

Column 4, line 35, "80" should be --76--.

Column 5, line 34, "40" should be --46--.

Column 5, line 68, "clockwise" should be --counterclockwise--.

Column 6, line 1, "clockwise" should be --counterclockwise--.

Column 6, lines 1-2, "as indicated by arrow 118" should be deleted.

Column 6, line 37, "bell" should be --belt--.

Column 7, line 45, the word after "apart" should be --rods--.

Column 8, line 31, "device" should be --machine--.

Column 8, line 34, "device" should be --machine--.

Column 8, line 40, "device" should be. --machine--.

Signed and Sealed this

Twenty-fourth Day of June 1986

[SEAL]

Attest:

DONALD J. QUIGG

Attesting Officer   Commissioner of Patents and Trademarks

UNITED STATES PATENT AND TRADEMARK OFFICE
CERTIFICATE OF CORRECTION

PATENT NO. : 4,561,150

DATED : December 31, 1985

INVENTOR(S) : Ray T. Townsend

It is certified that error appears in the above—identified patent and that said Letters Patent is hereby corrected as shown below:

Column 7, line 24, after "shield", insert --member--.

Column 7, line 38, after "blade", insert --means--.

Column 7, line 57, change "means" to --member--.

Column 9, line 54, change "feeding" to --feed--.

Column 10, line 12, change "and" to --opening--.

Column 10, lines 13, 15, 17, 43 and 47, change "end" to --opening--.

Column 10, line 24, change "cutting edge" to --knife edge-- and change "knife blade" to --skinning blade means--.

Column 10, line 37, after "shield", insert --member--.

Column 10, line 63, after "blade", insert --means--.

Column 11, line 11, after "shield", insert --member--.

Column 12, line 2, after "blade", insert --means--.

Column 12, line 18, after "shield", insert --member--.

Column 12, line 27, change "means", to --member--.

Signed and Sealed this

Seventh Day of October, 1986

[SEAL]

Attest:

DONALD J. QUIGG

Attesting Officer

Commissioner of Patents and Trademarks